(12) United States Patent
Lachermeier

(10) Patent No.: US 7,513,341 B2
(45) Date of Patent: Apr. 7, 2009

(54) COMBINED SERVICE BRAKE AND SPRING-LOADED BRAKE CYLINDER WITH INTERNAL VENTILATION

(75) Inventor: Jakob Lachermeier, Freising (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/098,107

(22) Filed: Apr. 4, 2008

(65) Prior Publication Data

US 2008/0284241 A1 Nov. 20, 2008

Related U.S. Application Data

(63) Continuation of application No. PCT/EP2006/009090, filed on Oct. 5, 2006.

(30) Foreign Application Priority Data

Oct. 6, 2005 (DE) .................. 10 2005 047 872

(51) Int. Cl.
*F01B 7/00* (2006.01)
(52) U.S. Cl. .................. 188/170; 188/153 D; 92/63; 92/82
(58) Field of Classification Search ............. 188/153 D, 188/170; 303/71; 92/48, 62, 63, 82

See application file for complete search history.

(56) References Cited

U.S. PATENT DOCUMENTS 3,736,842 A 6/1973 Valentine (Continued)

FOREIGN PATENT DOCUMENTS

DE 2 308 838 8/1973

(Continued)

OTHER PUBLICATIONS

International Preliminary Report on Patentability with an English translation of the pertinent portions (Twelve (12) pages).

(Continued)

*Primary Examiner*—Christopher P Schwartz
(74) *Attorney, Agent, or Firm*—Crowell & Moring LLP

(57) ABSTRACT

A combined service brake and spring-loaded brake cylinder includes an air-bleed valve having a piston supporting a valve body, which is guided inside a cylinder in an axially displaceable manner, and at least one first pressure spring supported on the piston being loaded against a first valve seat on the piston. The piston is loaded by at least one second pressure spring which is supported on the piston rod, in such a manner that the valve body is pushed toward a second valve seat on the piston rod and away from the first valve seat. A first piston area of the piston is loaded by the pressure in the spring chamber in a direction that lifts the valve body from the second valve seat and a second piston area by the pressure inside the service brake chamber in a direction that pushes the valve body toward the second valve seat and lifts it from the first valve seat, whereby a flow connection is established between the service brake chamber and the spring chamber by the valve seat and/or when the valve seat is lifted from the second valve seat.

11 Claims, 4 Drawing Sheets

U.S. PATENT DOCUMENTS

| | | | | |
|---|---|---|---|---|
| 5,372,059 | A | * | 12/1994 | Pierce et al. .................... 92/48 |
| 5,722,311 | A | * | 3/1998 | Pierce et al. .................... 92/63 |
| RE36,955 | E | * | 11/2000 | Pierce et al. .................... 92/48 |
| 7,395,906 | B2 | * | 7/2008 | Potter et al. ................. 188/170 |

FOREIGN PATENT DOCUMENTS

| | | |
|---|---|---|
| DE | 29 23 359 C2 | 12/1980 |
| DE | 35 03 216 A1 | 8/1986 |
| DE | 40 11 739 A1 | 10/1991 |
| DE | 102 28 934 A1 | 1/2004 |
| EP | 0 020 862 A1 | 1/1981 |
| EP | 0 025 558 B1 | 3/1981 |
| EP | 0 554 050 A1 | 8/1993 |
| GB | 1 237 641 A | 6/1971 |

OTHER PUBLICATIONS

International Search Report dated Feb. 2, 2007 with English translation (Four (4) pages).

* cited by examiner

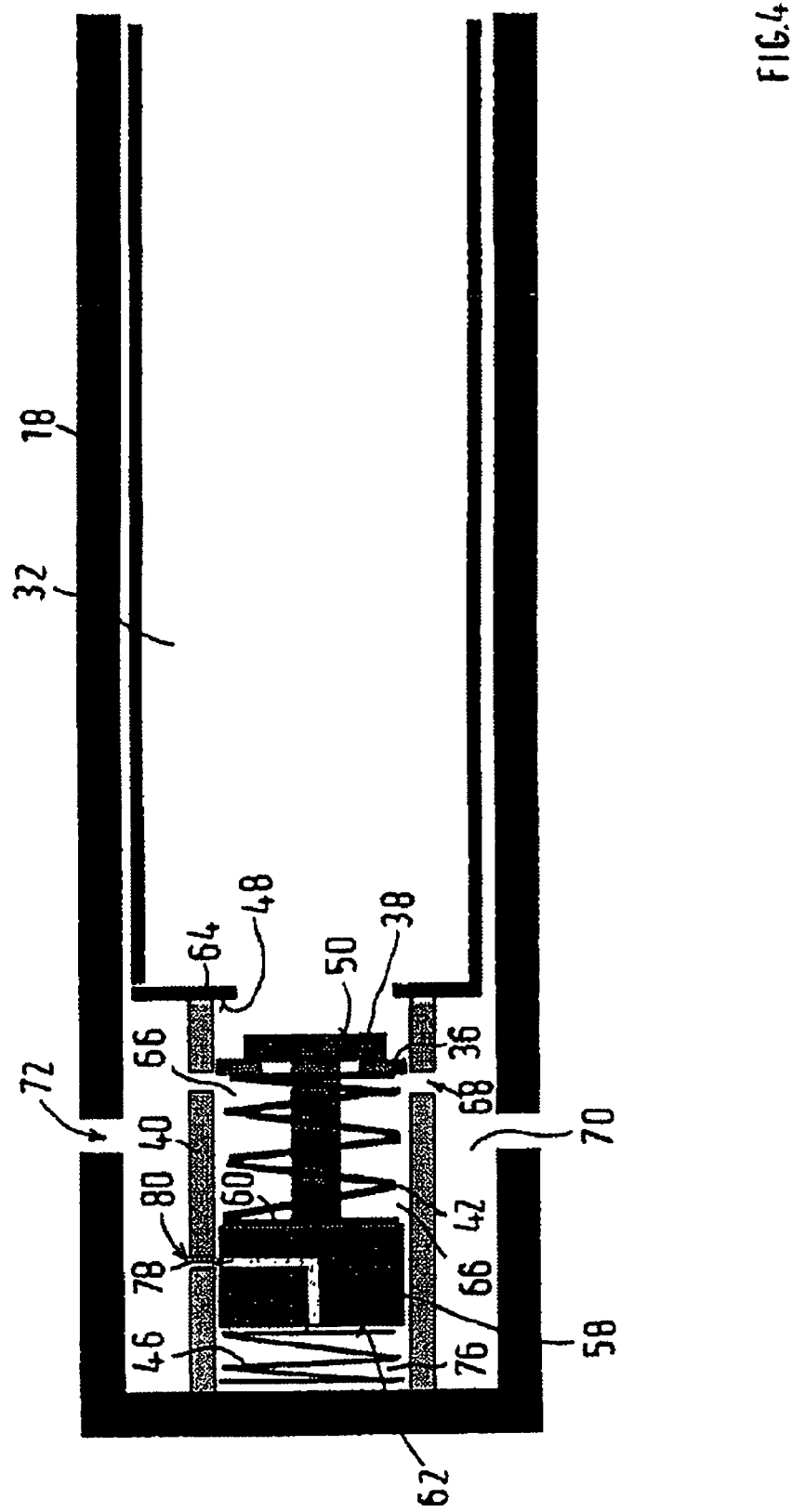

COMBINED SERVICE BRAKE AND SPRING-LOADED BRAKE CYLINDER WITH INTERNAL VENTILATION

CROSS-REFERENCE TO RELATED APPLICATIONS

This application is a continuation of PCT International Application No. PCT/EP2006/009090, filed on Oct. 5, 2006, which claims priority under 35 U.S.C. §119 to German Application No. 10 2005 047 872.7, filed Oct. 6, 2005, the entire disclosures of which are expressly incorporated by reference herein.

BACKGROUND AND SUMMARY OF THE INVENTION

The invention is based on a combined service brake and spring-loaded brake cylinder having a pressure-loaded diaphragm, which is arranged in a housing of the service brake cylinder and which delimits, on one side, a service brake chamber which can be acted on with service brake pressure and, on the other side, a chamber which holds a restoring spring. A spring brake piston is arranged in a housing of the spring brake cylinder and can be actuated by a preloaded spring. The spring brake piston delimits, on one side, a spring brake chamber and, on the other side, a spring chamber which holds a preloaded spring and which has a piston rod which carries a ventilation valve which produces or blocks a flow connection between the spring chamber.

A combined service brake and spring-loaded brake cylinder of the above-described type is known, for example, from DE 40 11 739 A1. There, the ventilation (air-bleed) valve is arranged at the end side in the hollow piston tube of the spring brake piston, which can project into the service brake chamber depending on the operating state. The air-bleed valve has the task of dissipating the overpressure generated, when the parking brake is released, by the retraction of the parking brake piston and the resulting reduced volume of the spring chamber, by virtue of the valve being switched into its open position and producing a flow connection between the spring chamber and the service brake chamber. When starting a vehicle on a planar (or flat) underlying surface, the service brake chamber is deaerated and connected to a deaeration system of a pressure regulating module, since a service braking process is not necessary after the release of the parking brake. It is then possible for at least part of the excess air volume in the spring chamber to flow out, which accordingly passes from there not directly into the atmosphere, for example via a valve arranged in the wall of the spring chamber, but rather via the aerating and deaerating path of the service brake chamber. In this context, the term internal deaeration or internal ventilation is therefore also used.

When starting on an uphill underlying surface, it is however necessary, when the parking brake is first applied, to at least briefly also apply the service brake before releasing the parking brake in order to prevent the vehicle from rolling backward when starting. In this case, the service brake chamber is aerated. In the event of a sufficiently high braking demand by the driver, the service brake pressure, which prevails in the service brake chamber and simultaneously at one side of the piston, seeks to hold the piston against the valve seat, and thereby to hold the deaeration valve closed, counter to the action of the pressure building up in the spring chamber. However, if the service brake pressure and/or the service brake pressure gradient are below certain threshold values on account of a correspondingly low service braking demand by the driver, then the service brake pressure prevailing at one side of the piston is not sufficient to hold the deaeration valve closed. Compressed air then flows from the service brake chamber via the open deaeration valve into the spring chamber. From there, the compressed air escapes via the piston seal and the housing seal into the atmosphere, which first generates disturbing noises. Secondly, the air volume which flows out via the deaeration valve is no longer available for building up the service brake force.

The present invention is based on the object of further developing a combined service brake and spring-loaded brake cylinder of the type mentioned above such that the above-specified disadvantages are avoided.

According to the invention, the air-bleed valve of the combined service brake and spring-loaded brake cylinder has the following features:

a) a piston which carries a valve body, which piston is guided in an axially movable manner in a cylinder, with at least one first pressure spring which is supported on the piston loading the valve body against a first valve seat on the piston;

b) the piston is loaded by at least one second pressure spring, which is supported against the piston rod, in such that the valve body is forced in the direction of a second valve seat on the piston rod and away from the first valve seat;

c) a first piston face of the piston is loaded by the pressure in the spring chamber in a direction which lifts the valve body from the second valve seat, and a second piston face is loaded by the pressure in the service brake chamber in a direction which forces the valve body against the second valve seat and lifts the valve body up from the first valve seat;

d) a flow connection between the service brake chamber and the spring chamber being produced when the valve body is lifted up from the first valve seat and/or when the valve body is lifted up from the second valve seat.

By way of the measures, it is ensured that the air-bleed valve remains closed if the service brake is simultaneously applied when the parking brake is applied. It is, therefore, no longer possible for compressed air to flow over from the service brake chamber via the air-bleed valve into the spring chamber and to escape from there into the atmosphere, as a result of which disturbing noises are prevented.

Advantageous refinements of and improvements to the invention specified in the independent claims are possible by means of the measures listed in the claims.

More precise details can be gathered from the following description of exemplary embodiments.

An exemplary embodiment of the invention is illustrated below and explained in more detail in the following description.

BRIEF DESCRIPTION OF THE DRAWINGS

FIG. 4 shows the air-bleed valve from FIG. 1 in an open position during the release of the parking brake.

DETAILED DESCRIPTION OF THE DRAWINGS

Figure 1:
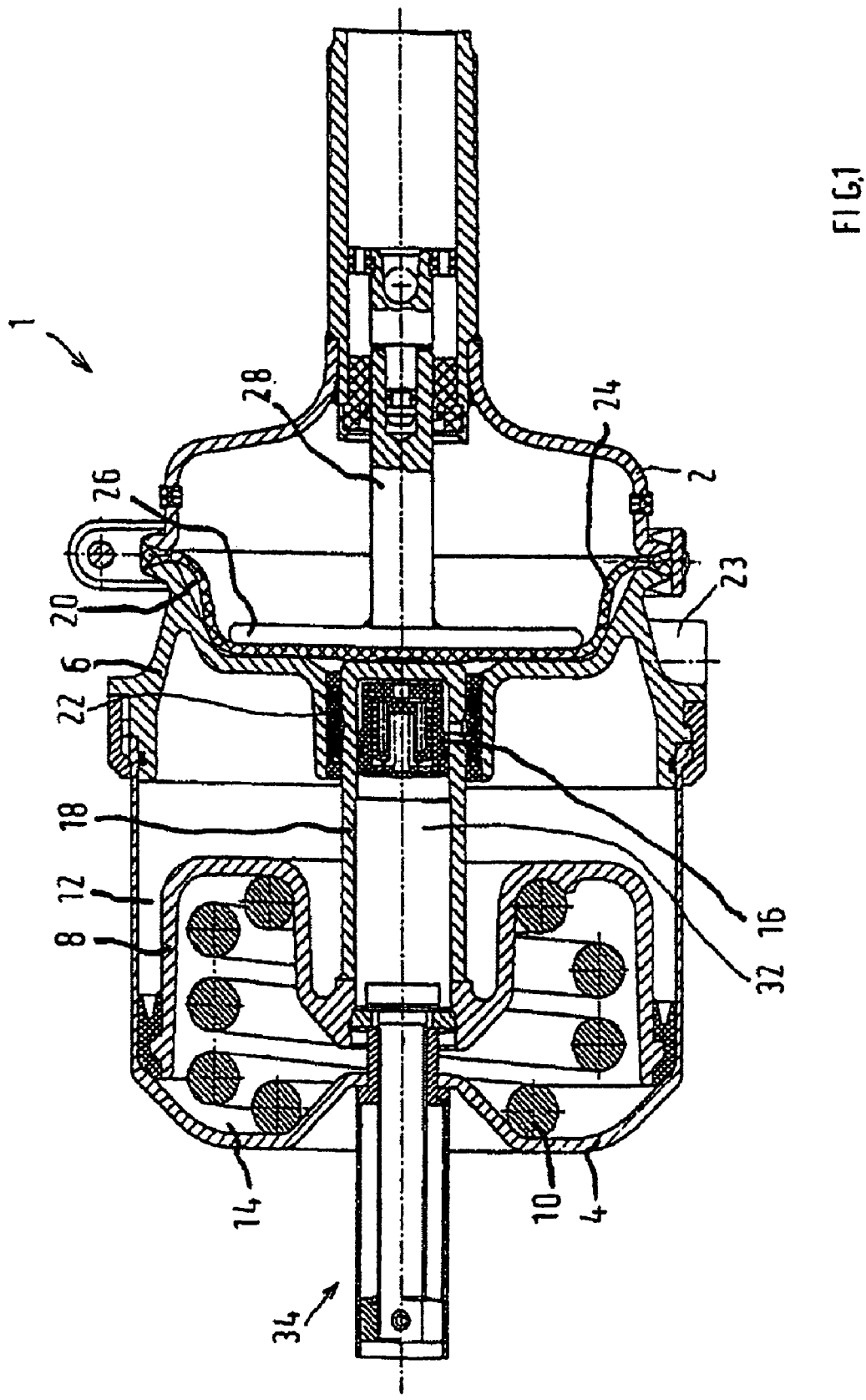
FIG. 1 shows a section illustration of a combined service brake and spring-loaded brake cylinder as per a preferred embodiment of the invention with an air-bleed (deaeration) valve.

FIG. 1 illustrates, for an exemplary explanation of the invention, a combined service brake and spring-loaded brake cylinder 1, referred to below as a combination cylinder. The combination cylinder is composed of a service brake cylinder 2 and a spring-loaded brake cylinder 4, which is structurally and functionally connected to the service brake cylinder 2. The service brake cylinder 2 and the spring-loaded brake cylinder 4 are separated from one another by an intermediate wall 6. A spring brake piston 8 is movably arranged within the spring-loaded brake cylinder 4, with a preloaded spring bearing against one side of the spring brake piston 8. The preloaded spring 10 is supported at its opposite side against the base of the spring-loaded brake cylinder 4.

Formed between the spring brake piston 8 and the intermediate wall 6 is a spring brake chamber 12, which is connected to a pressure regulating module (not shown for reasons of scale) in order to aerate and deaerate the spring brake chamber 12. During aerating, the spring brake piston is moved axially, under the preload of the preloaded spring 10, into the release position of the parking brake. During this movement of the spring brake piston 8, the air which is present within the spring chamber 14 containing the preloaded spring 10 is pushed out via an air-bleed valve 16. If, in contrast, for the purposes of braking, the spring brake chamber 12 is deaerated, then the preloaded spring 10 seeks to move the spring brake piston 8 into the parking brake application position.

The spring brake piston 8 is connected to a hollow piston rod 18, which extends through the intermediate wall 6 into a service brake chamber 20 of the service brake cylinder 2. A seal 22, which is inserted into the intermediate wall 6, provides sealing with respect to the outer wall of the piston rod 18 during its longitudinal movement. An inlet 23 opens out into the service brake chamber 20, via which inlet 23 compressed air is let in and discharged for actuating the service brake cylinder 2. The compressed air acts on a diaphragm 24, which is inserted within the service brake cylinder 2 and at an opposing surface thereof is provided a thrust piece in the form of a diaphragm plate 26. The diaphragm plate 26 is connected to a push rod 28, which interacts with a brake actuating mechanism outside the combination cylinder 1. The brake actuating mechanism can, for example, be actuating elements of a disk brake of a motor vehicle. The service brake cylinder 2 is an active brake cylinder, that is to say the service brake is applied by aerating the service brake chamber and released by deaerating. A restoring spring (not shown), which is supported at one side against the diaphragm plate 26 and at the other side against the base of the service brake cylinder 2, ensures that the push rod 28 is returned to the release position when the service brake chamber 20 is bled.

The air-bleed valve 16 is arranged in the end of the piston rod 18, which points away from the spring brake piston 8 and, more precisely, in the interior space 32 of the piston rod 18. Although an emergency release device 34, which is of no further interest here, is arranged there, it is however possible for the interior space 32 of the piston rod 18 to communicate with the spring chamber 14.

Figure 2:
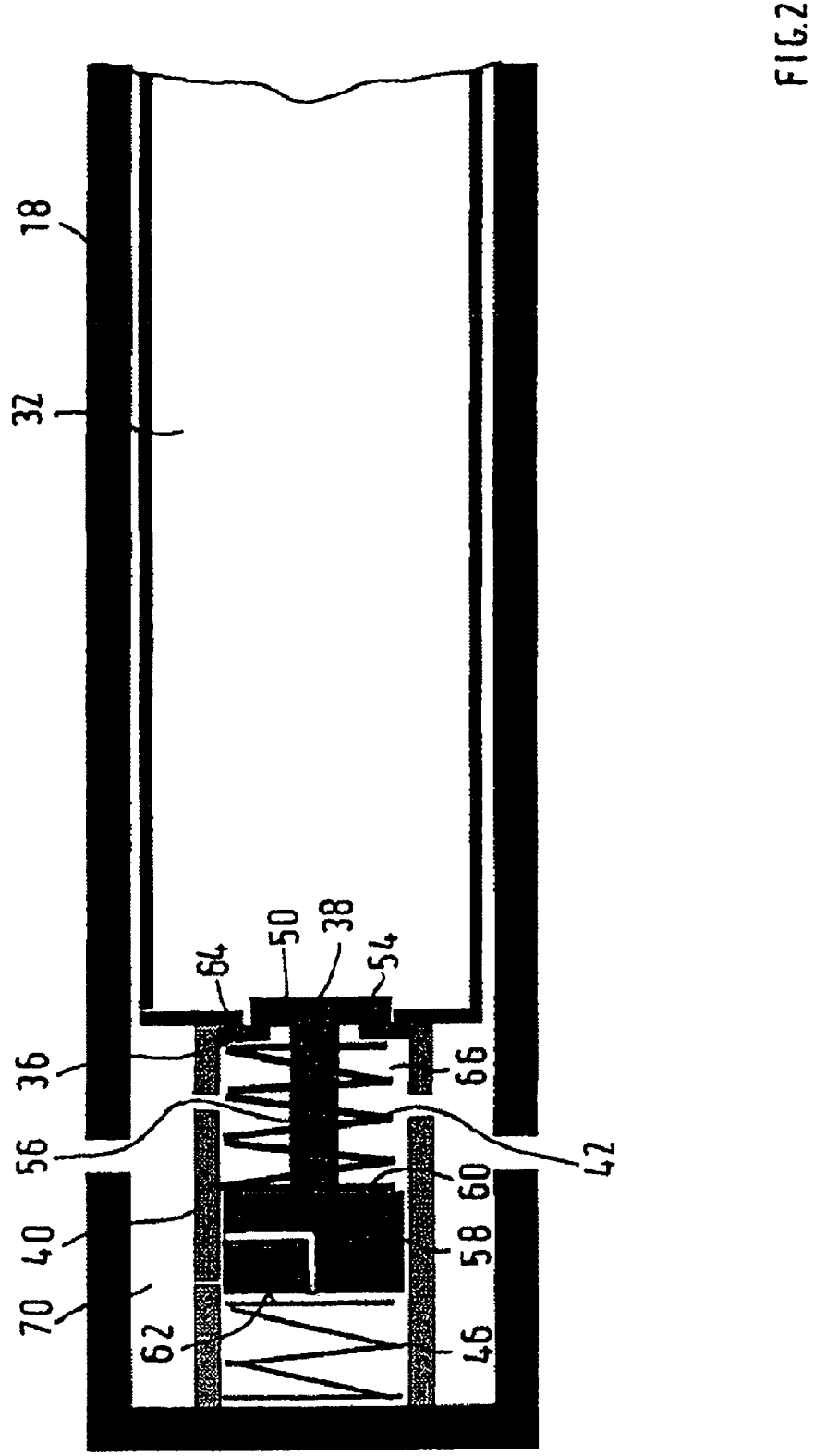
FIG. 2 shows the air-bleed valve from FIG. 1 in the closed position.
Figure 3:
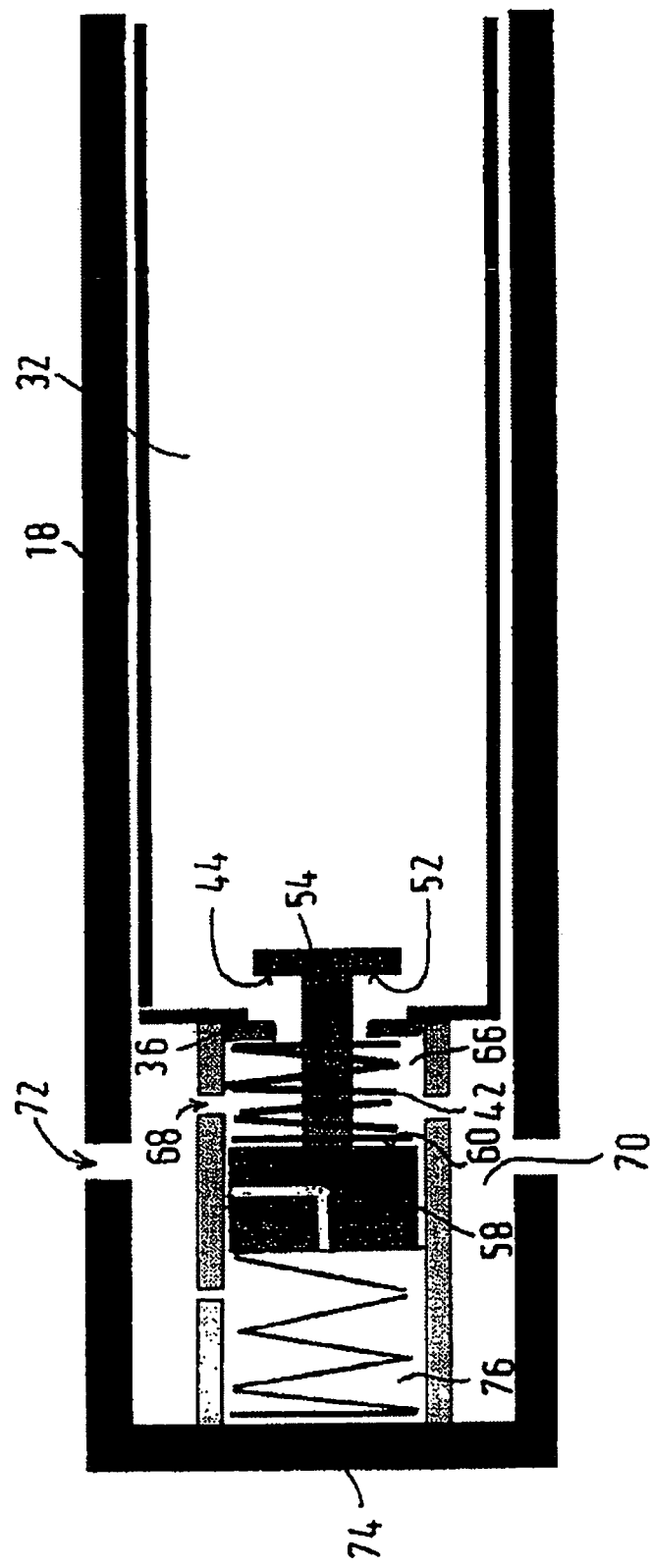
FIG. 3 shows the air-bleed valve from FIG. 1 in an open position during the application of the parking brake.

The air-bleed valve 16 of the combined service brake and spring brake cylinder has, as per FIGS. 2-4, the following features.

a) A piston 38, which carries a valve body 36, is provided, which piston 38 is guided in an axially movable manner in a cylinder 40, with at least one first pressure spring 42, which is supported on the piston 38, loading the valve body 36 against a first valve seat 44 on the piston 38.

b) The piston 38 is loaded by at least one second pressure spring 46, which is supported against the piston rod 18, in such a way that the valve body 36 is forced in the direction of a second valve seat 48 on the piston rod 18 and away from the first valve seat 44.

c) A first piston face 50 of the piston 38 is loaded by the pressure in the spring chamber 14 in a direction which lifts the valve body 36 from the second valve seat 48, and a second piston face 52 is loaded by the pressure in the service brake chamber 20 in a direction which forces the valve body 36 against the second valve seat 48 and lifts the valve body 36 up from the first valve seat 44.

d) A flow connection between the service brake chamber 20 and the spring chamber 14 is produced when the valve body 36 is lifted up from the first valve seat 44 and/or when the valve body 36 is lifted up from the second valve seat 48.

As can be seen from FIG. 2 to FIG. 4, the piston 38 has substantially three sections: (1) a first piston section, which faces toward the spring chamber 14 and which has a first piston plate 54 on which the first piston face 50 and the second piston face 52 are formed; (2) a second piston section, which adjoins the first piston section and which is embodied as a piston rod 56; and (3) a third piston section which is embodied as a second piston plate 58 and on which a third piston face 60 and a fourth piston face 62 are formed. The third piston face 60 and the fourth piston face 62 are, for example, of equal size. The cylinder 40 is held in a rotationally and axially fixed manner in the interior space 32 of the piston rod 18.

Formed between the third piston face 60, the radially inner peripheral face of the cylinder 40 and a base 64 of the cylinder 40 is a first chamber 66, with the base 64 of the cylinder 40 having a central passage opening through which the first piston plate 54 can extend. The second valve seat 48 is formed on the base 64 of the cylinder 40 on its face which points toward the first chamber 66, as shown in FIG. 4. The first valve seat 44 is situated on the second piston face 52, which faces toward the first chamber 66, of the piston 38 (FIG. 3). Also held in the first chamber 66 is the first pressure spring 42 which is supported at one side against the valve body 36 and at the other side against the third piston face 60 on the second piston plate 58.

The valve body 36 is preferably embodied as a ring which surrounds the piston rod 56 and whose outer diameter is smaller than the inner diameter of the cylinder 40, so that a clear annular gap is provided between the ring 36 and the cylinder 40. The ring 36 therefore seals only in the axial direction against the first valve seat 44 on the first piston plate 54 or against the second valve seat 48 on the base 64 of the cylinder 40.

By means of a radial passage bore 68 in the cylinder 40, the first chamber 66 is flow-connected to an annular chamber 70 permanently, that is to say in every axial position of the piston 38. The annular chamber 70 surrounds the cylinder 40 and is, in turn, connected by a radial passage bore 72 in the piston rod 18 to the service brake chamber 20. Furthermore, a third chamber 76 is formed between the second piston plate 58 and a further base 74 of the cylinder 40, in which third chamber 76 is held the second pressure spring 46 which is supported at one side against the second piston plate 58 and at the other side against the further base 74 of the cylinder 40. The first pressure spring 42 and the second pressure spring 46 are installed so as to be preloaded.

The second piston plate 58 has a piston bore 78, having an axial section and a radial section. The piston bore 78 can produce a flow connection between the third chamber 76 and the annular chamber 70, provided that its radial section is aligned with a further radial passage bore 80 in the cylinder 40, with that aligned state being provided in only one position of the piston 38 (FIG. 4).

FIG. 2 shows the air-bleed valve 16 in its closed position, that is to say the ring 36 bears axially and sealingly against the first valve seat 44 and against the second valve seat 48 and there is consequently no flow connection between the interior space 32 of the piston rod 18, which is under the pressure of the spring chamber 14, and the annular chamber 70, which is connected to the service brake chamber 20.

Proceeding from a state in which neither the service brake nor the parking brake is actuated, the parking brake is now applied while the service brake is still released. As a result of the spring brake piston 12 being moved by the preloaded spring 10, the spring chamber 14 abruptly increases in size, as a result of which the pressure there drops sharply. The relatively low pressure of the spring chamber 14 therefore acts on the first piston face 50, and the second piston face 52 is loaded by the pressure of the service brake chamber 20, which corresponds to the atmospheric pressure, which is higher than the relatively low pressure.

As a result of the pressure difference, the piston 38 in FIG. 3 is moved to the right counter to the action of the shortening first pressure spring 42, as a result of which the first valve seat 44 lifts off of the ring 36 and a flow cross section is opened between the ring 36 and the piston rod 56, through which a flow is generated, by which air can flow out of the service brake chamber 20 via the passage bore 72 in the piston rod 18 into the annular chamber 70, from there via the radial passage bore 68 in the cylinder 40 into the first chamber 66, and from there finally into the interior space 32 of the piston rod 18, which is in turn connected in a pressure-conducting manner to the spring chamber 14. It is therefore possible for a pressure equalization between the spring chamber 14 and the service brake chamber 20 to take place. In contrast, the ring 36 remains pressed sealingly against the second valve seat 48 on the base 64 of the cylinder 40 by the action of the first pressure spring 42.

The gradually increasing pressure in the spring chamber 14 also loads the third piston face 60, so that the piston 38 is moved to the left in FIG. 3 as a result of the pressure force which is generated there, until the first valve seat 44 on the second piston face 52 abuts sealingly against the ring 36 again. This movement is assisted by the spring force of the first pressure spring 42 until the air-bleed valve 16 is situated once again in the closed position shown in FIG. 2.

During the release of the parking brake, the pressure in the spring chamber 14 rises as a result of its reduction in size. As can be easily seen on the basis of FIG. 4, the increased pressure acts on the first piston face 50, as a result of which the piston 38 moves to the left counter to the action of the shortening second pressure spring 46, and at the same time, the ring 36 which is braced against the piston 38 by way of the first pressure spring 42 and is thereby guided with the piston 38 lifts up from the second valve seat 48 on the base 64 of the cylinder 40. Since the ring 36 does not seal radially against the cylinder 40, but rather an annular gap is always left free there, it is now possible for compressed air to flow from the spring chamber 14 via the interior space 32 of the piston rod 18, the first chamber 66, the passage bore 68 in the cylinder 40, the annular chamber 70 and the passage bore 72 in the piston rod 18 into the service brake chamber 20, which is acted on with a lower pressure than the spring chamber 14.

At the same time, the piston 38 moves into a position in which the radial section of the piston bore 78 is in alignment with the further passage bore 80 in the cylinder 40, and consequently the third chamber 76 is also acted on with the pressure prevailing in the service brake chamber 20, which pressure rises as a result of the inflow of compressed air from the spring chamber 14. The same service brake pressure therefore acts on the third piston face 60 and the fourth piston face 62, so that the corresponding pressure forces cancel one another out.

After pressure equalization between the spring chamber 14 and the service brake chamber 20 has taken place, the piston 38 is moved to the right into the closed position as a result of the action of the shortened second pressure spring 46, in which closed position the ring 36 bears sealingly and axially against the second valve seat 48 again.

FIG. 2 also shows a closed position of the air-bleed valve 16, which is assumed if the service brake is also actuated when the parking brake is applied. Such a situation occurs, for example, when starting uphill.

When the parking brake is applied, the pressure in the spring chamber 14 falls, as already explained with regard to FIG. 3, as a result of which the piston 38 moves to the right. After pressure equalization has taken place between the spring chamber 14 and the service brake chamber 20, that is to say when the pressure in the spring chamber 14 has increased as a result of the inflow of air from the service brake chamber 20, the first pressure spring 42 re-establishes the closed position. If, proceeding from this state, the service brake is now also actuated, the pressure in the service brake chamber rises. The increased service brake pressure then also prevails in the first chamber 66, because compressed air can pass into the first chamber 66 via the passage bore 72 in the piston rod 18, the annular chamber 70 and the passage bore 68 in the cylinder 40. The service brake pressure also acts on the ring 36, as a result of which the latter intensifies its sealing action against the first valve seat 44 and the second valve seat 48 and assists the action of the first pressure spring 42 which holds the ring 36 there.

TABLE OF REFERENCE SYMBOLS

1 Service brake and spring store
2 Service brake cylinder
4 Spring-loaded brake cylinder
6 Intermediate wall
8 Spring brake piston
10 Preloaded spring
12 Spring brake chamber
14 Spring chamber
16 Deaeration valve
18 Piston rod
20 Service brake chamber
22 Seal
23 Inlet
24 Diaphragm
26 Diaphragm plate
28 Push rod
32 Interior space
34 Emergency release device
36 Valve body
38 Piston
40 Cylinder
42 First pressure spring
44 First valve seat
46 Second pressure spring
48 Second valve seat
50 First piston face
52 Second piston face
54 First piston plate
56 Piston rod
58 Second piston plate
60 Third piston face
62 Fourth piston face
64 Base
66 First chamber
68 Passage bore 70 Annular chamber
72 Passage bore
74 Base
76 Third chamber
78 Piston bore
80 Passage bore The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A combined service brake and spring-loaded brake cylinder, comprising:
   a) a pressure-loaded diaphragm, which is arranged in a housing of a service brake cylinder and which delimits, on one side, a service brake chamber acted upon with service brake pressure and, on the other side, a chamber which holds a restoring spring;
   b) a spring brake piston, which is arranged in a housing of the spring-loaded brake cylinder and which is actuatable by a preloaded spring and which delimits, on one side, a spring brake chamber and, on the other side, a spring chamber which holds a preloaded spring and which has a piston rod;
   c) an air-bleed valve, carried in the piston rod, which air-bleed valve produces or blocks a flow connection between the spring chamber and the service brake chamber;
   wherein the air-bleed valve comprises:
      (1) a piston which carries a valve body, which piston is guided in an axially movable manner in a cylinder, with at least one first pressure spring supported on the piston loading the valve body against a first valve seat on the piston;
      (2) the piston is loaded by at least one second pressure spring, which is supported against the piston rod, such that the valve body is forced in a direction of a second valve seat on the piston rod and away from the first valve seat;
      (3) a first piston face of the piston is loaded by pressure in the spring chamber in a direction which lifts the valve body from the second valve seat, and a second piston face is loaded by pressure in the service brake chamber in a direction which forces the valve body against the second valve seat and lifts said valve body up from the first valve seat; and
      (4) a flow connection between the service brake chamber and the spring chamber is produced when the valve body is lifted up from the first valve seat and/or when the valve body is lifted up from the second valve seat.

2. The service brake and spring-loaded brake cylinder according to claim 1, wherein the piston also has a third piston face and a fourth piston face, with the third piston face being loaded by the pressure in the service brake chamber in a direction which lifts the valve body up from the second valve seat and forces said valve body against the first valve seat, and the fourth piston face being loaded by the pressure in the service brake chamber in a direction which forces the valve body against the second valve seat and lifts said valve body up from the first valve seat.

3. The service brake and spring-loaded brake cylinder according to claim 2, wherein a position of the piston exists in which a chamber, which holds the second pressure spring and which is delimited by the fourth piston face, is flow-connected via a piston bore to the service brake chamber.

4. The service brake and spring-loaded brake cylinder according to claim 3, wherein the valve body is formed by an axially sealing ring against which the first pressure spring is supported.

5. The service brake and spring-loaded brake cylinder according to claim 4, wherein the second valve seat is formed on a base of the cylinder.

6. The service brake and spring-loaded brake cylinder according to claim 3, wherein the second valve seat is formed on a base of the cylinder.

7. The service brake and spring-loaded brake cylinder according to claim 2, wherein the valve body is formed by an axially sealing ring against which the first pressure spring is supported.

8. The service brake and spring-loaded brake cylinder according to claim 2, wherein the second valve seat is formed on a base of the cylinder.

9. The service brake and spring-loaded brake cylinder according to claim 1, wherein the valve body is formed by an axially sealing ring against which the first pressure spring is supported.

10. The service brake and spring-loaded brake cylinder according to claim 9, wherein the second valve seat is formed on a base of the cylinder.

11. The service brake and spring-loaded brake cylinder according to claim 1, wherein the second valve seat is formed on a base of the cylinder.

* * * * *